United States Patent [19]

Sutter

[11] 3,918,674
[45] Nov. 11, 1975

[54] SHUTOFF DEVICE
[75] Inventor: Hanspeter Sutter, Uster, Switzerland
[73] Assignee: Luwa AG, Zurich, Switzerland
[22] Filed: June 24, 1974
[21] Appl. No.: 482,097

[30] Foreign Application Priority Data
Sept. 3, 1973 Switzerland....................... 12581/73

[52] U.S. Cl....................................... 251/5; 251/24
[51] Int. Cl.²............................................ F16K 7/07
[58] Field of Search......................... 251/5, 24, 61.1

[56] References Cited
UNITED STATES PATENTS

| | | | |
|---|---|---|---|
| 3,145,967 | 8/1964 | Gardner | 251/5 |
| 3,669,142 | 10/1970 | Gerbic | 251/5 X |
| 3,836,113 | 9/1974 | Johnson | 251/5 |

*Primary Examiner*—Irwin C. Cohen
*Assistant Examiner*—Richard Gerard
*Attorney, Agent, or Firm*—Werner W. Kleeman

[57] ABSTRACT

A shutoff or closure device incorporating a housing possessing an inlet opening and an outlet opening and an elastic hose body arranged therein, the ends of the hose body are fixed at the housing. The hose body further has a throughpassage which can be closed and which intercommunicates the inlet opening with the outlet opening and a substantially ring-shaped pressure compartment is bounded between the housing inner wall and the hose body into which opens a conduit connection provided at the housing. A core portion extends approximately coaxially within the throughpassage and forms at its periphery a seating surface for the hose body. A nozzle directed towards the outlet opening is arranged within the throughpassage, this nozzle being operatively connected with a further conduit connection provided at the housing.

4 Claims, 1 Drawing Figure

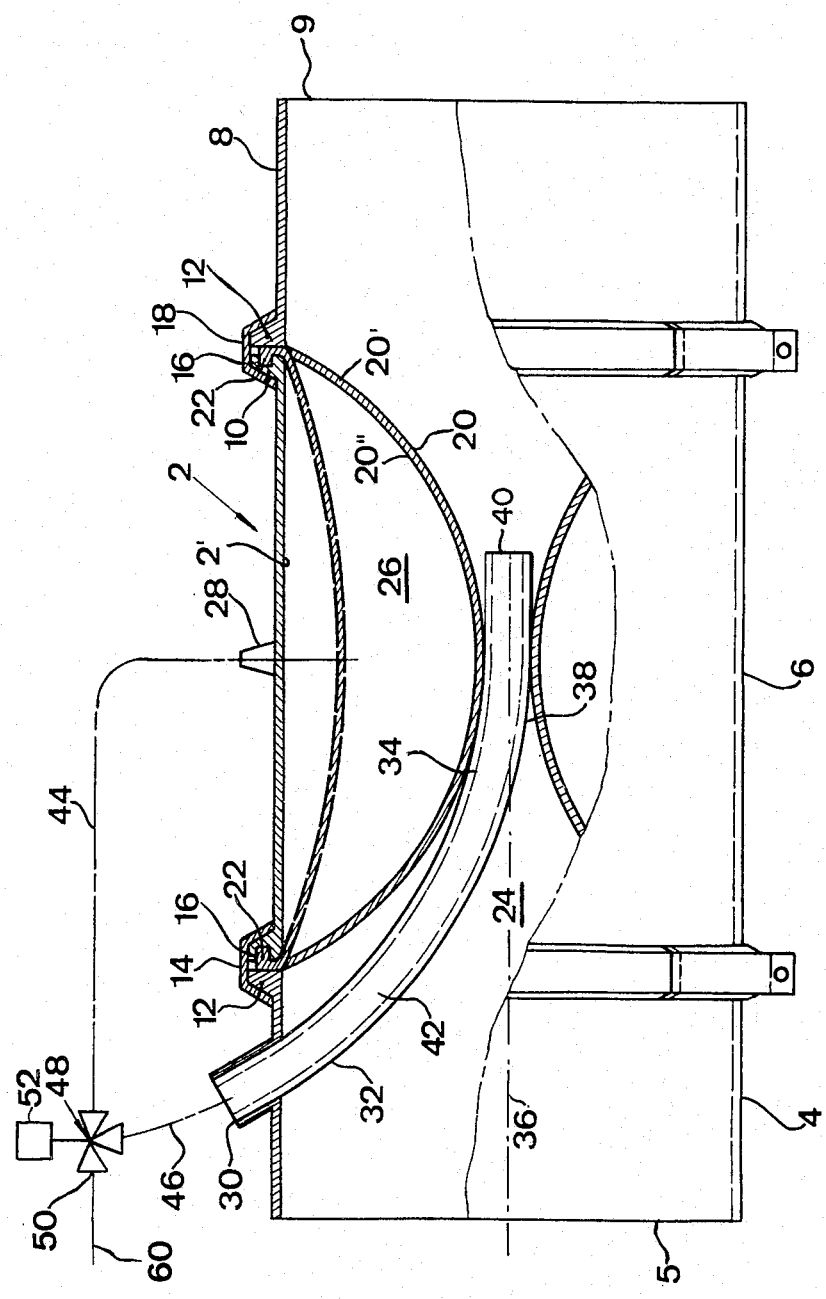

SHUTOFF DEVICE

BACKGROUND OF THE INVENTION

The present invention relates to a new and improved construction of shutoff or closure device of the type incorporating a housing possessing an inlet opening and an outlet opening and an elastic hose body arranged within such housing, the ends of the hose body being fixed at the housing and such hose body forming a closable throughpassage which flow communicates the inlet opening with the outlet opening, and further, wherein a substantially ring-shaped pressure compartment is enclosed between the housing inner wall and the hose body, a conduit connection being provided at the housing which opens into such pressure compartment.

Shutoff devices of such type, also referred to sometimes in the art as hose valves, are particularly satisfactory for use in cases where a fluent material is intended to be transported through a closable transport or conveying conduit, for instance pneumatically, owing to the extremely low susceptibility of contamination of such type hose valves. Such shutoff devices however are associated with the drawback that particularly owing to the aging effects which arise at the hose material after a certain amount of time it is no longer possible to obtain with absolute reliability a complete shutting off of the throughflow cross-section.

SUMMARY OF THE INVENTION

Hence, it should be apparent that there is still a need in this particular art for a shutoff element which is not associated with the aforementioned drawbacks and limitations of the prior art constructions.

Another and more specific object of the present invention aims at the provision of a new and improved construction of shutoff device wherein the aforementioned drawbacks are effectively avoided and at the same time there is solved the problem of accelerating the opening operation of the shutoff device.

Still a further important object of the present invention relates to an improved shutoff device which is relatively simple in construction and design, extremely reliable in operation, not readily subject to breakdown or contamination, and requires a minimum of maintenance and servicing.

Now in order to implement these and still further objects of the invention, which will become more readily apparent as the description proceeds, the shutoff device of this development is manifested by the features that there is provided a core portion which extends approximately coaxially in the throughpassage and forming a seating surface for the hose body at its periphery. Additionally there is provided a nozzle which is directed towards the outlet opening and which is arranged in the throughpassage, this nozzle being operatively connected with a further conduit connection provided at the housing.

By virtue of the solution of the invention wherein the cylindrical core portion on the one hand assumes the function of a seating element for the hose body and on the other hand assumes the function of a support for the vent opening constructed as the nozzle, there is realized a shutoff or closure device which for the prevailing closing pressure permits of a rapid and reliable shutting off of the throughflow cross-section and especially also allows for a rapid and complete opening of such throughflow. If the conduit connection operatively coupled with the nozzle is connected through the agency of an appropriate control valve with the pressure compartment or chamber, then the pressure compartment is actively emptied by the negative pressure which forms at the neighborhood of the nozzle.

BRIEF DESCRIPTION OF THE DRAWING

The invention will be better understood and objects other than those set forth above, will become apparent when consideration is given to the following detailed description thereof. Such description makes reference to the annexed drawing wherein in the single FIGURE of the drawing there is shown by way of an example, partly in front view and partly in sectional view, a preferred exemplary embodiment of shutoff or closure device as designed according to the teachings of the invention.

DETAILED DESCRIPTION OF THE PREFERRED EMBODIMENTS

Describing now the drawing, reference numeral 2 generally designates a housing composed of a substantially tubular-shaped inlet portion 4, a substantially tubular-shaped intermediate or central portion 6 and a substantially tubular-shaped outlet portion 8. The intermediate housing portion 6 is provided at both of its opposed ends with the flanges 10 while the ends of the housing portions 4 and 8 which confront the intermediate portion 6 each have a respective flange 12. The flanges 10 are provided at their end faces 14 with ring-shaped grooves or depressions 16 in which there are seated bulbous-shaped enlarged or thickened ends 22 of a hose body 20 formed of a suitable gas impervious elastic material, for instance rubber. Neighboring flanges 10 and 12 of the housing portion 6 and 4 and 6 and 8 respectively are pressed against one another by the action of an associated clamping ring 18 or equivalent structure, the enlarged ends 22 of the hose body 20 beneficially functioning as seals.

The hose body 20 which in its unstretched condition approximately possesses the same length as the intermediate housing portion 6, delimits with its inside surface 20' a throughflow or throughpassage 24 between the inlet housing portion 4 i.e. the inlet opening 5 provided at its free end and the outlet housing portion 6 i.e. the outlet opening 9 thereof. On the other hand, between the outside wall or surface 20'' of the hose body 20 and the inside surface or wall 20' of the housing 2, specifically in the embodiment under discussion the inside wall of the intermediate housing portion 6 there is delimited a pressure compartment 26 into which opens a connection stud or conduit connection 28 which is conveniently attached to such intermediate housing portion.

Continuing, it will be observed that internally of the inlet housing portion 4 there is secured at the housing wall 2' a curved support or carrier arm 32. This carrier arm 32 extends at an acute angle with respect to the axis 36 of the throughflow or throughpassage 24 in a direction away from the wall 2' of the housing 2 towards the axis 36 which, as will be readily recognized, constitutes the lengthwise extending axis of the housing 2. As the support arm 32 progressively approaches the lengthwise axis 36 the enclosed angle between the support arm 32 and the axis 36 likewise becomes progressively smaller. The support arm 32 is equipped at its free end with, for instance, a substantially cylindrical core portion 34 extending approximately coaxially with respect to the throughpassage 24. This core portion 34 is provided at its periphery or outer surface with a seating surface 38 for the hose body or hose 20 when it assumes its closing position illustrated in full lines.

According to a preferred manifestation of the invention the support arm 32 is constructed as a continuous pipe or tubular element which carries at the inlet housing portion 4 a connection stud or conduit connection 30 and at the core portion 34 a nozzle 40 which is directed towards the outlet housing portion 8. If there is considered the full-line illustrated closed position of the shutoff device then the nozzle 40 is preferably arranged in the portion of the throughflow or throughflow passage 24 which again widens. The hollow tubular element forming the support arm 32 thus forms a vent channel 42.

As clearly seen by referring to the drawing the connection studs or conduit connections 28 and 30 are coupled via the schematically indiated conduits or lines 44 and 46 with a three-way valve 48. Valve 48 is operatively coupled at location 50 with a compressed air network or other source of pressurized fluid medium, as generally indicated by reference character 60, and can be conveniently actuated, for instance, by means of an electromagnet 52. The outlet housing portion 8 therefore can be connected in air flow communication via the three-way valve 48 with the pressure compartment 26.

It is assumed that the shutoff device is arranged in a conduit in which there is periodically conveyed by means of a blower airstream or current air which is charged for instance with textile fibers. The inlet housing portion 4 of the shutoff device is therefore coupled with the not particularly illustrated conduit section of the conduit which is located upstream in the direction of flow, whereas the outlet housing portion 8 is connected with the likewise not particularly illustrated conduit section of such conduit which in this instance is located downstream in the direction of flow.

The shutoff device is closed in known manner in that the connection 50 is operatively coupled via the three-way valve 48 with the conduit connection or connection stud 28 through the agency of the conduit 44 so that pressurized fluid medium, in this case compressed air flows into the pressure compartment 26. As a result the hose body 20, which it will be recalled possesses elastic properties, is expanded out of the broken line illustrated open position inwardly and the throughpassage 24 narrows until finally the hose body is pressed against the seating surface or seat 38 of the core portion 34, as shown in full lines. The throughpassage or throughflow passage 24 is therefore closed-off.

As clearly recognized by referring again to the drawing the hose body 20, in order to provide a complete closure of the throughpassage 24, in contrast to the heretofore known hose valves, no longer need reduce in size or narrow down to the diameter null, rather only must reduce in size to a diameter defined by the seating surface 38. In this way there is effectively avoided any extreme deformation of the hose body, i.e. the formation of pronounced folds, creases or the like. Apart from the thus resulting increase in the longevity of the hose body the coaction between the hose body and the seating surface furthermore insures for a reliable and complete closing or shutoff action, even then when owing to the aging of the material of the hose body its elasticity has decreased. Finally, the seating surface possesses an advantageous effect in that the closing operation for given pressure conditions and given radial closing path is terminated much more quickly than if the reduction in size of the hose body had to be down to the diameter null.

A further advantageous aspect from the standpoint of a complete and rapid closing of the cross-section of the throughflow passage is realized also by virtue of the fact that the core portion 34 is mounted at the end of a support or carrier arm 32 which owing to its cross-section and course or direction of extent permits of a less elastic bending, in order to allow for centering of the core portion and the seating surface 38 when the hose body comes to bear at one side.

The opening of the shutoff device occurs in a particularly simple manner owing to the fact that the support arm 32 is constructed as a tubular element or pipe, and specifically, the pressure compartment 26 is flow connected via the three-way valve 48 with the vent channel 42 and therefore with the nozzle 40. The outflow of the air contained within the pressure compartment 26 via the conduits 44 and 46 as well as the vent channel 42 is thus accelerated due to the fact that a negative pressure forms at the nozzle 40. This negative pressure occurs as soon as the hose body, under the influence of the decreasing internal pressure within the pressure compartment, lifts-off of the seating surface, so that there can be adjusted at the throughflow or throughpassage 24 a flow current in the direction of the outlet portion 8 under the effect of the continuously conveying air ventilator or blower which has not been particularly illustrated since it may be of conventional design. The negative pressure at the region of the nozzle 40 causes the air in the hose body to be conveyed away not only because of the stress or stretching of the hose body which was previously present, but also that such air will be conveyed away under a suction action. Consequently, the hose body also carries out the opening movement in a comparatively shorter time.

The selected construction of the core portion 34 as an extension of the support arm 32 as well as the course of the support arm 32 so as to extend at an acute angle with regard to the axis of the throughpassage has the beneficial effect that material which should be transported through the throughpassage cannot deposit at such components. Even air currents charged with fibers can be controlled free of disturbance with this shut-off or closure device.

The described shutoff device is equally suitable for mounting in a transport conduit or duct wherein the conveying action occurs by a suction ventilator. In this instance the negative pressure which prevails in the transport conduit acts at the outlet opening 9 which is continually connected with the nozzle 40. If with the shutoff device closed the vent channel 42 is connected with the pressure compartment 26 by actuating the three-way valve 48, then the opening movement of the hose body occurs as a practical matter extremely suddenly due to the negative pressure which continuously prevails at the nozzle 40.

While there is shown and described present preferred embodiments of the invention, it is to be distinctly understood that the invention is not limited thereto but may be otherwise variously embodied and practiced within the scope of the following claims.

Accordingly, what is claimed is:

1. A shutoff device comprising a housing having an inlet opening and an outlet opening, an elastic hose body having opposed ends and arranged within said housing, means for securing the opposed ends of said hose body at said housing, said hose body forming a closable throughpassage which flow communicates the inlet opening with the outlet opening of the housing, said housing having an inner wall, said hose body being arranged within said housing such that there is formed a substantially ring-shaped pressure compartment between the housing inner wall and the hose body, a conduit connection provided at the housing and opening into said ring-shaped pressure compartment, a core portion extending approximately coaxially within the throughpassage, said core portion forming at its periphery a seating surface for the hose body, a nozzle provided in said core portion and directed towards the outlet opening, said nozzle being provided at an end of the core portion which confronts the outlet opening, a further conduit connection provided at the housing, said nozzle being operatively connected with said further conduit connection.

2. The shutoff device as defined in claim 1, wherein said housing comprises a substantially tubular-shaped housing construction composed of an intermediate housing portion and two end housing portions, and wherein said securing means includes structure for clamping one end of the hose body between one of the end housing portions and the intermediate housing portion and the other end of the hose body between the other end housing portion and the intermediate housing portion.

3. A shutoff device comprising a housing having an inlet opening and an outlet opening, an elastic hose body having opposed ends and arranged within said housing, means for securing the opposed ends of said hose body at said housing, said hose body forming a closable throughpassage which flow communicates the inlet opening with the outlet opening of the housing, said housing having an inner wall, said hose body being arranged within said housing such that there is formed a substantially ring-shaped pressure compartment between the housing inner wall and the hose body, a conduit connection provided at the housing and opening into said ring-shaped pressure compartment, a core portion extending approximately coaxially within the throughpassage, said core portion forming at its periphery a seating surface for the hose body, a nozzle directed towards the outlet opening and arranged in the throughpassage, a further conduit connection provided at the housing, said nozzle being operatively connected with said further conduit connection, and an arm for resiliently supporting in a cantilever manner the core portion at the housing.

4. The shutoff device as defined in claim 3, wherein said arm comprises a tubular element, the core portion having a vent channel, and the nozzle being connected via the vent channel of the core portion with said further conduit connection.

* * * * *